July 3, 1934.    M. H. HILL ET AL    1,964,799
METHOD OF AND MACHINE FOR CUTTING GEARS
Filed Aug. 28, 1930    5 Sheets-Sheet 1

Fig. 1

INVENTOR
M.H.Hill and M.H.Johanson
BY
Schlesinger
their ATTORNEY

July 3, 1934.  M. H. HILL ET AL  1,964,799
METHOD OF AND MACHINE FOR CUTTING GEARS
Filed Aug. 28, 1930  5 Sheets-Sheet 2

Fig. 2

INVENTOR
M. H. Hill and M. H. Johanson
BY
 B. Schlesinger
their ATTORNEY

July 3, 1934.  M. H. HILL ET AL  1,964,799
METHOD OF AND MACHINE FOR CUTTING GEARS
Filed Aug. 28, 1930  5 Sheets-Sheet 5

INVENTOR
M. H. Hill and M. H. Johanson
BY
Their ATTORNEY

Patented July 3, 1934

1,964,799

UNITED STATES PATENT OFFICE 1,964,799

METHOD OF AND MACHINE FOR CUTTING GEARS

Maxwell H. Hill and Magnus H. Johanson, Rochester, N. Y., assignors to Gleason Works, Rochester, N. Y., a corporation of New York Application August 28, 1930, Serial No. 478,344

15 Claims. (Cl. 90—4)

The present invention relates to the cutting of gears and particularly of longitudinally curved tooth gears. In a more particular aspect, this invention relates to the cutting of longitudinally curved tooth bevel and hypoid pinions.

The present invention has for its primary purpose to provide a method and a machine for roughing longitudinally curved tooth bevel and hypoid pinions which will permit roughing these pinions so that the roughed blank will have slots tapering in width like the tooth spaces of the finished pinion, thereby leaving a minimum of stock to be removed in the finishing operation.

In cutting longitudinally curved tooth pinions, it has heretofore been the practice to rough out each tooth slot completely in a single setting of the face-mill cutting tool. Thus the tooth slots of the roughed blank have had parallel sides curved longitudinally about the same center. In most bevel and hypoid pinion work, however, in order to obtain a suitable meshing action between the pinion and its mate gear, the finished pinion blank must have tooth spaces whose sides are curved longitudinally about different centers. A decided disadvantage of the old method of roughing, therefore, is that a very large amount of stock is left on the teeth of the roughed blank, especially at the large end of the teeth of the blank, which has to be removed in the finishing operation. The removal of this excess of metal puts a heavy burden on the finishing tool, necessitates frequent re-sharpenings of the tool, and reduces the production from the finishing machine.

It is a purpose of the present invention, as applied to the roughing operation, to permit roughing of tooth slots of tapering width and this purpose is achieved by roughing each slot from two different centers, one side of the tooth of the roughed blank being cut from one center and the other side from a different center. To this end, after the tool has been fed into depth, the tool and blank are rolled together in one direction and one side of the tooth slot is roughed out from one center, then the cutter and blank are shifted relative to one another, the roll is reversed, and during the reverse roll, the other side of the tooth slot is roughed from the new center to which the cutter has been shifted. At the end of the reverse or return roll, the blank is indexed and the cutter shifted back to its initial position ready to cut in the next tooth slot.

In production work, the larger member of a longitudinally curved tooth bevel or hypoid pair is ordinarily finish-cut "spread-blade", that is, both sides of a tooth space are finish-cut simultaneously from the same center. There are cases, however, where longitudinally curved tooth bevel and hypoid gears are finish-cut one side at a time. In these cases, also, the present invention can be used to advantage to rough-cut the gears, and with or without a generating roll.

The process of the present invention is not confined, however, to roughing. It can be used for finish-cutting also, and has the advantage that it permits of finish-cutting either a gear or a pinion with two sides cut from different centers in a single continuous operation with a single manual setting of the tool. As a finishing process, then, it eliminates some of the loss of time required at present by changes in set-up in finishing first one side and then the other of a gear or pinion and thus makes it possible to produce a finished gear or pinion having teeth of properly tapering width in shorter time than is possible with present finishing practice.

The process of the invention and an improved type of gear cutting machine for carrying out the process are illustrated in the accompanying drawings, in which:

Figure 12 is a fragmentary side elevation and Figure 13 a fragmentary end elevation, showing the first position of the tool and blank in roughing a spiral bevel pinion according to the present preferred method of this invention;

Figure 14 is a diagrammatic view similar to Figure 12 showing how the cutter and blank are shifted to permit cutting a slot of the desired tapering width in the blank;

Figure 15 is a view similar to Figure 13, showing particularly the results obtained with the present invention whereby a minimum of stock is left on the roughed blank to be removed in the finishing operation;

Figure 16 is a fragmentary plan view of the cutter and blank showing how the two are shifted;

Figure 17 is a fragmentary end view of the cutter and blank showing how the cutter operates at the small end of the tooth slot; and Figure 18 is a view looking at the other end of the pinion blank, showing how the cutter operates to enlarge the tooth space at the large end of the blank.

As stated, the invention is illustrated as embodied in a machine for roughing spiral bevel pinions. In this machine, the cutter which is rotating in engagement with the blank, is first fed into full depth. Then the cutter and blank are rolled together in one direction. At the end of this roll, the cutter slide is unlocked and shifted and the work spindle is simultaneously rotated or indexed slightly relative to the mechanism producing the generating roll thereof. Both the cutter slide and the work spindle are then relocked and the generating roll proceeds in the opposite direction. During this roll in the opposite direction, the cutter cuts from a new center, thus producing through its two cuts a tooth space which tapers in width from the small end of the blank outwardly. Preferably, the cutter is so shifted that it does not alter the width of the tooth slot at the small end of the tooth during the return roll. At the end of the return roll, the cutter head is unlocked and shifted back to initial position, the cutter is withdrawn out of the tooth space and the blank indexed. The cycle then begins anew.

The slight relative rotation between the work spindle and the generating mechanism at the end of the roll in the first direction and the indexing of the work spindle at the end of the return roll is effected through operation of a mechanism which includes a pair of notched plates, each of which has a number of equi-spaced notches equal to the number of tooth spaces to be cut in the pinion. These plates are mounted on the work spindle so that the notches of one plate are staggered with reference to the notches of the other. There is a locking dog co-operating with each of these plates. During the cutting portion of the cycle, first one dog and then the other is engaged with its plate to lock the work spindle to partake of the rolling motion. At the end of the roll in the first direction, the locking dog, which has been in locking position, is released automatically, permitting a slight rotary motion to take place between the work spindle and the generating mechanism until the other dog has arrived at a position where it engages a notch of its plate and locks the work spindle up again. At the end of the return roll, this second dog is released automatically, permitting another relative rotational movement to take place between the work spindle and generating mechanism until the first dog returns into engagement with a notch of its plate relocking the work spindle. The notches of the index plate are so staggered that the relative movement at the end of the roll in the first direction sets the pinion blank over just enough to cause the cutter to produce the desired tapering of the tooth space on the return roll, while the relative movement that takes place at the end of the return roll completes the indexing of the blank to bring a new portion of the blank into position to have a tooth space roughed therein on the new cycle.

With this brief description of the operation of the machine, reference may now be had to the drawings for a more detailed description thereof and for a more complete understanding of the invention.

20 indicates the base or frame of the machine. Journaled in a circular bearing in the bearing-portion 21 of the frame is an oscillatory cradle 22. The cradle 22 is formed at its front end with parallel T-slots 23. Mounted on the cradle for adjustment and sliding movement thereon is a plate 24. The plate 24 is adapted to be secured to the face of the cradle by means of T-bolts, designated at 25, which engage in the T-slots 23 formed in the face of the cradle. Mounted on the plate 24 for angular adjustment thereon about the axis of a bolt 27 is a cutter support 28. This cutter support 28 is formed with a suitable bearing portion 30 (Figs. 2 and 7) which extends through an opening 31 in the plate 24 and within the hollow central portion of the cradle 22. The cutter support 28 can be adjusted accurately to any desired angular position by means of the graduations 32 formed on the plate 24 and which read against a zero mark on the support 28. The support 28 can be secured in any adjusted position by means of bolts 29 which engage in the circular T-slot 32 formed in the plate 24 and which is curved about the center of the bolt 27 as a center.

Figure 2:
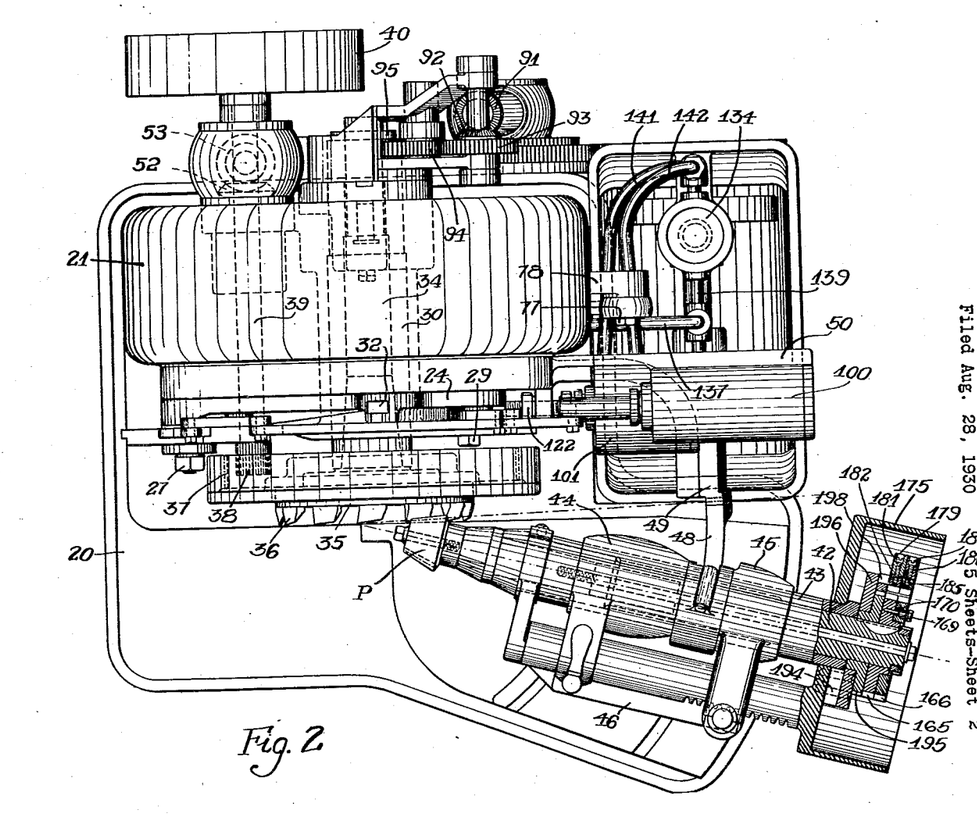
Figure 2 is a plan view of this machine, parts being broken away.
Figures 6, 7, 8, 9:
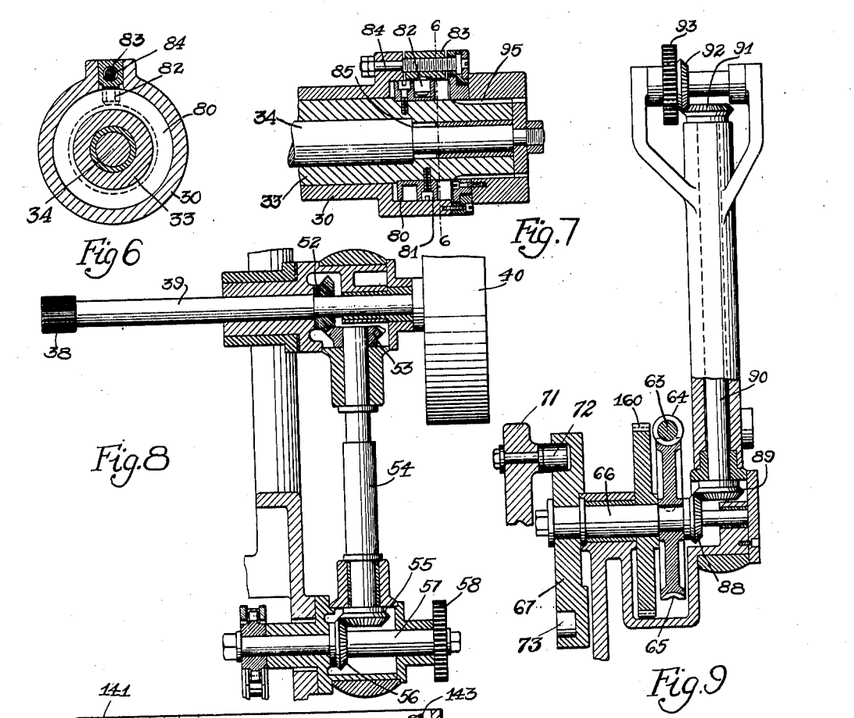
Figure 6 is a section on the line 6—6 of Figure 7.
Figure 7 is a fragmentary sectional view showing details of the feed mechanism.
Figures 8 and 9 are fragmentary views showing details of the drive.

Journaled in a sleeve 33 rotatably mounted in the bearing-portion 30 of the support 28 is the cutter spindle 34 (Figs. 2 and 7). Secured to the cutter spindle at its front end in any suitable way is the face mill cutter 35.

The cutter 35 may be of the usual type in which case alternate blades 36 will have outside and inside cutting edges or it may be constructed so that each of the blades is formed with an outside and an inside cutting edge. The cutter head is fixed to an internal gear 37. The internal gear 37 is rotated, to impart the cutting motion to the cutter, by the pinion 38 which meshes therewith and which is mounted on the shaft 39 (Fig. 8) to which the machine drive-pulley 40 is secured.

The pinion blank P to be cut is secured in any suitable manner to the work spindle 42 of the machine. This spindle 42 is rotatably mounted in a sleeve 43 which is journaled in suitable bearings 44 and 45 formed on the work head 46. This work head 46 is angularly adjustable on the bed or frame 20 to position the work in the correct operative relation to the cutter.

Secured to the sleeve 43 by any suitable means is a gear segment 48 which meshes with a crown gear segment 49 (Figs. 1 and 2), that is secured to an arm 50 which is fastened to the cradle 22.

Figure 1:
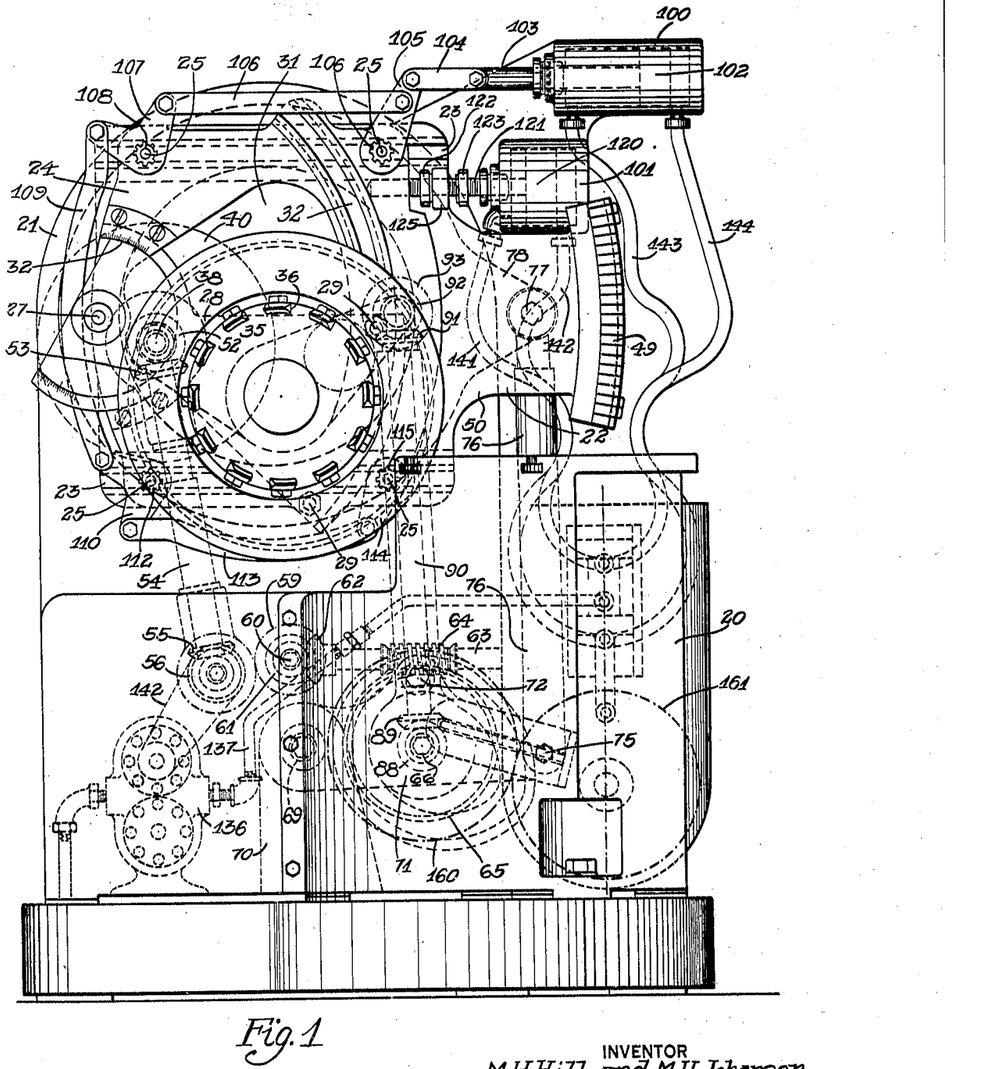
Figure 1 is a side elevation, with the work head removed, of a machine constructed according to this invention for the purpose of either roughing or finish cutting spiral bevel pinions.

Secured to the pulley shaft 39 (Figs. 1 and 8) is a miter gear 52 which meshes with and drives a miter gear 53 which is secured to the telescoping shaft 54. The shaft 54 carries at its lower end a miter gear 55 which meshes with and drives a miter gear 56 that is secured to the shaft 57. The shaft 57 carries at one end a spur gear 58 which meshes with and drives a spur gear 59 on a shaft 60. The shaft 60 carries a miter gear 61 (Fig. 1) that drives a miter gear 62 which is secured to the worm shaft 63 (Figs. 1 and 9). The worm shaft 63 carries a worm 64 which meshes with and drives a worm gear 65 which is secured to the shaft 66.

Secured to this same shaft 66 is a cam 67. Pivoted at 69 on a bracket or support 70 secured to the frame of the machine is an arm 71 (Figs. 1 and 9). This arm carries a roller 72 which engages in the cam-track 73 of the cam 67. Pivoted to the arm 71 at 75 is a connecting rod 76 which has a pivotal connection at its upper end at 77 to an arm 78 which is secured to the cradle.

By means of the cam and connecting rod, an oscillating motion is imparted to the cradle, oscillating the cutter about the axis of the cradle and imparting at the same time an oscillatory movement to the work spindle through the segments 49 and 48 and the sleeve 43, while this sleeve is connected, as will be described hereinafter, to the work spindle 42. The oscillatory motion of the cradle and the oscillatory movement of the work spindle combine to produce the generating roll. The cam 67 may be so formed as to produce a complete roll, in which case the profiles of the teeth of the pinion P may be completely generated, or the cam 67 may be formed, as is the practice in pinion roughers, so as to produce only the amount of roll necessary to roll out the lengthwise tooth curve, thereby reducing to a minimum the time required for the roughing operation.

The tool is fed into full depth and withdrawn again to permit indexing of the blank by means of the cam 80 (Figs. 6 and 7) which is secured by the screws 81 to the sleeve 33. Co-operating with the cam 80 is the cam roller 82 which is carried on a block 83 that is adjustably supported by the threaded rod 84. The rod 84 secured in a suitable bearing formed on the bearing-portion 30 of the cutter support. The sleeve 33 is formed internally to abut against a shoulder 85 formed on the cutter spindle 34, thereby to impart to the cutter the feeding and withdrawing motions produced by the cam 80.

The cam 80 is rotated from the shaft 66 through the miter gears 88 and 89, the swinging shaft 90 (Figs. 1 and 9), the miters 91 and 92, and the change gears 93, 94 and 95, the latter being formed integral with the sleeve 33, as clearly shown in Figure 7.

So far as described, the machine illustrated in the present drawings is substantially identical in construction and operation with the machine described in the patent to E. W. Bullock et al., No. 1,385,200, of July 19, 1921, and reference may be had to that patent for a more detailed description of the parts of the present machine already mentioned.

In the machine of the Bullock et al. patent, after the cutter has been fed into full depth, the cutter and blank are rolled together in one direction and a tooth space is roughed out. Then the roll is reversed, the cutter is withdrawn from engagement with the blank, and the blank is indexed. There is no setting over of the cutter at the end of the roll in one direction, the cutter operating only during the roll in one direction. Hence, both sides of each tooth space are roughed from the same center. Thus tooth spaces having bottoms of uniform width throughout their length are cut in the blank. In the machine of the present invention, both the tool and blank are shifted after the roll in one direction and the cutter remains in engagement with the blank during the return roll, operating from a different center on the return roll. Thus a tooth space is cut in the blank which has its sides curved longitudinally about different centers and which has, therefore, a bottom tapering in width from one end to the other. In the machine illustrated in the drawings, the set-over of the tool is effected automatically by hydraulically operated mechanism which will now be described, while the set-over of the blank is produced by a type of index mechanism which is operated by the rolling motion as will appear hereinafter.

Mounted on the arm 50 which is secured to the cradle are a pair of cylinders 100 and 101 (Figs. 1 and 2). The piston 102 which reciprocates in the cylinder 100 is pivotally connected through the piston-rod 103 with a link 104. This link 104 is pivotally connected, in turn, to an arm 105 which is secured to the nut 106 of one of the T-bolts 25 which serve to secure the slide 24 in adjusted position on the face of the cradle. The arm 105 is pivotally connected with a link 106 which in turn is pivotally connected with one arm of a bell-crank 107 which is secured to the nut 108 of a second T-bolt 25. The other end of the bell-crank is connected by a link 109 with a bell-crank 110 which is secured to the nut 112 of a third T-bolt 25 and this bell-crank 110 is, in turn, connected by a link 113 with an arm 114 that is secured to the nut 115 of a fourth T-bolt 25.

It will be seen that when the piston 102 is moved to the left in the cylinder 100 from the position shown in Figure 1, the nuts 106, 108, 112, and 115 will be unthreaded, loosening the connection between the slide 24 and the cradle and that when the piston 102 is returned to the position shown in Figure 1, the slide 24 will be again clamped to the cradle.

The cylinder 101 houses a piston 120 which is reciprocable therein. The piston-rod 121, which is secured to this piston, is threaded for the portion of its length which extends outside the cylinder. A pair of spaced nuts 122 and 123 are adjustably carried on the threaded portion of the piston-rod. These nuts are adapted to engage, respectively, the spaced lug 125 which is formed integral with the slide 24. Assuming that the slide 24 has been unclamped by the movement of the piston 102 to the left, the slide can be moved in either direction by movement of the piston 120 to the left or right.

In the machine illustrated, the movements of the pistons 102 and 120 are governed, respectively, by the valves 130 and 131 (Fig. 10) and the cams 132 and 133, respectively. The valve 130 reciprocates in a valve sleeve 134 and the valve 131 in a valve sleeve 135.

Oil is pumped from a sump in the base of the machine by means of an oil pump 136 (Fig. 1) which may be of any suitable construction and is carried to the valve chambers 134 and 135 by the pipe 137 which threads into a T (Fig. 10) which is connected by means of pipes 138 and 139, respectively, with the valve chambers 134 and 135, respectively. The pump 136 is driven by the chain 142 (Fig. 1) from the shaft 57.

The valve chamber 134 is connected by means of flexible hose 141 and 142, respectively, with opposite ends of the cylinder 101. The valve chamber 135 is connected by flexible hose 143 and 144, respectively, with opposite ends of the cylinder 100.

Figure 10:
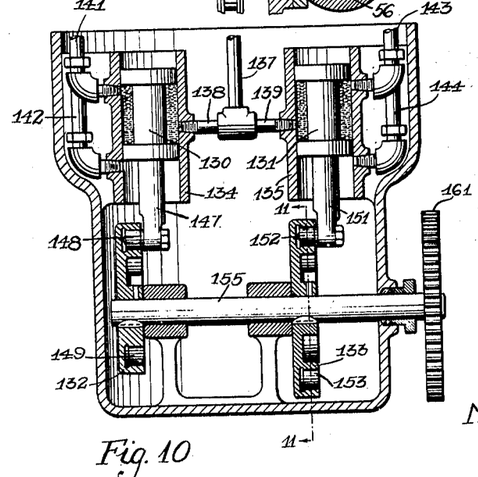
Figure 10 is a sectional view showing details of the control cams and valves governing the locking and unlocking of the tool slides and the movement thereof.
Figure 11:
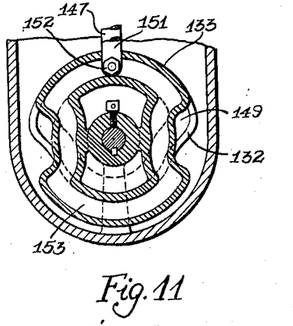
Figure 11 is a section on the line 11—11 of Figure 10, looking in the direction of the arrows.

The stem 147 of the valve 130 carries a roller 148 which engages in the trackway 149 of the cam 132. The stem 151 of the valve 131 carries a roller 152 which engages in the trackway 153 of the cam 133. The two cams 132 and 133 are keyed to a shaft 155 which is suitably journaled in the base of the machine and which is driven from the shaft 66 by the spur gears 160 and 161 (Figs. 1, 9, and 10).

The cam 133 is constructed to impart two movements to the valve 131 for each movement imparted to the valve 130 by the cam 132. In the position shown in the drawings, the line 143 leading from the valve chamber 135 to the cylinder 100 is on supply and the line 144 on exhaust. In this position, the cutter slide 24 is clamped rigidly to the cradle. The pipe 141 leading to the cylinder 101 is, also, on supply and the pipe 142 on exhaust. At the end of the roll in one direction, the cam 133 operates to shift the valve 131, placing the line 144 on supply and the line 143 on exhaust, thereby causing the piston 102 to be moved to the left to release the T-bolts 25 and thereby unclamp the cutter slide 24 from the cradle. Immediately thereafter, the cam 132 operates to shift the valve 130, putting the line 142 on supply and the line 141 on exhaust, thereby causing the piston 120 to move to the left, shifting the slide 24 on the cradle and changing the position of the center of the cutter. As soon as the shifting has taken place, the valve 131 is reversed by the cam 133 putting the line 143 again on supply and the line 144 again on exhaust, thereby causing the piston 102 to move to the right to cause the T-bolts to reclamp the slide 24 to the cradle. The cutter remains in its shifted position during the return roll of the cradle. At the end of the return roll, the slide 24 is again unlocked, the cutter shifted back to initial position and the slide again locked with the cutter in position to operate upon a new portion of the pinion blank.

During the shifting of the cutter at both ends of the roll, the blank is also shifted, this latter movement comprising a slight rotational movement of the blank at the end of the first part of the generating cycle and the indexing of the blank to the next tooth space when the generating cycle has been completed. The mechanism for shifting the blank will now be described.

Keyed to the work spindle 42 is an index plate 165 and on the hub of this plate, a second plate 166 is adjustably mounted (Figs. 2 to 5 inclusive). Each of these plates is provided with a number of notches equal to the number of tooth spaces to be cut in the pinion. The notches of the plate 165 are designated at 167 and the notches of the plate 166 at 168. The two plates are mounted so that the notches of one plate are staggered with reference to the notches of the other and the shortest angular distance between a notch 168 of one plate and a notch 167 of the other plate is equal to the angular set-over of the blank required to secure a groove of the desired taper in width. After adjustment, the two plates are clamped together by the nut 169 which threads onto the pin 170 that is secured in the plate 165 and passes through the arcuate slot 171 in the plate 166.

175 designates a guard which encloses the index mechanism. The sleeve 43 is formed within this guard with a pair of integral arms 176 and 177. Pivotally mounted on the arm 177 for swinging movement about the axis of a stud 178 is a pair of levers 179 and 180. Secured to the lever 179 by means of screws 181 is a locking dog 182. Secured to the lever 180 by means of screws 184 is a locking dog 185. The locking dog 182 is adapted to co-operate with the notches 167 of the index plate 165 while the locking dog 185 is adapted to co-operate with the notches 168 of the index plate 166. The locking dogs are constantly urged toward engagement with their respective plates by the coil springs 187 and 188, respectively. These springs are secured at one end, respectively, to studs 189 and 190 that are threaded into their respective levers 179 and 180. At their opposite ends, the springs 187 and 188 are secured to a stud 191 which is fixed in the arm 176 of the sleeve 43.

Figure 3:
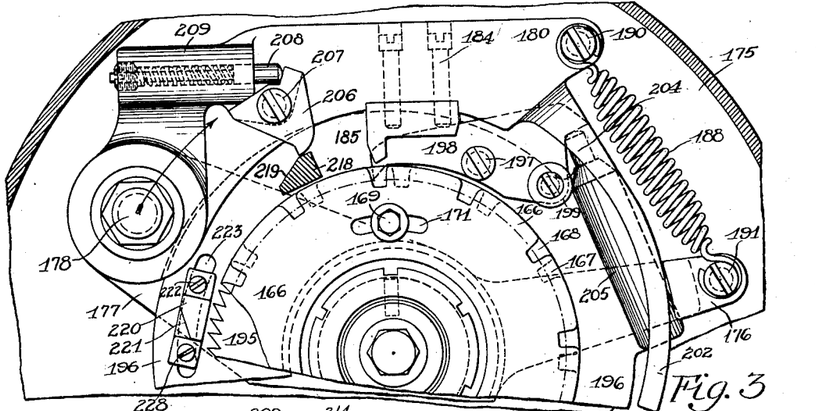
Figure 3 is a fragmentary end view of the index mechanism of this machine, showing the parts in the positions which they occupy when indexing is taking place.
Figures 4, 5:
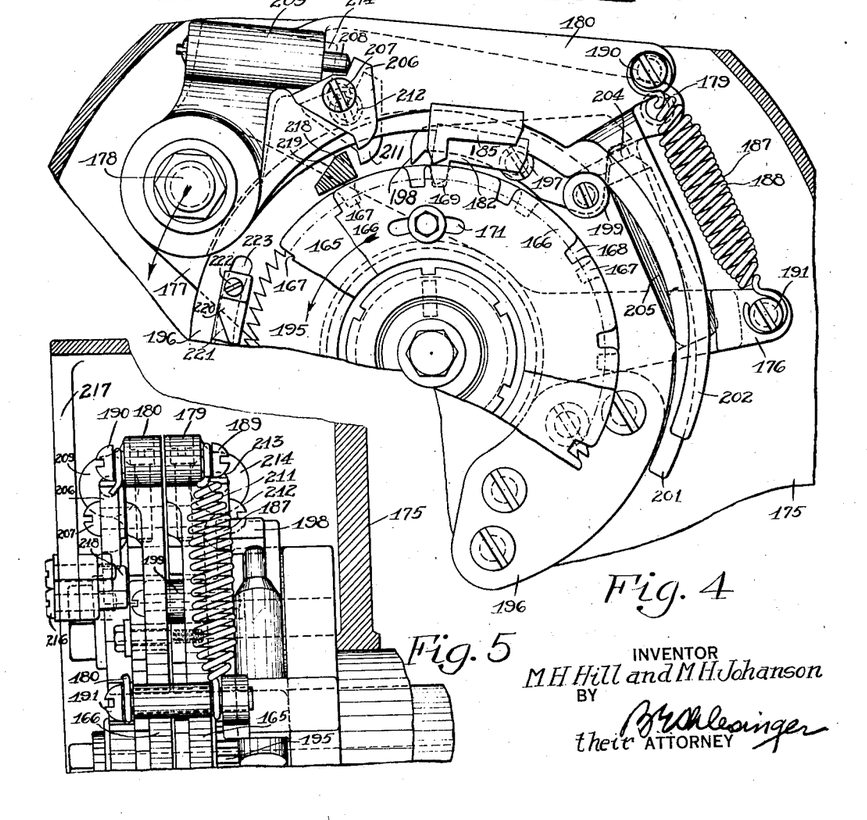
Figure 4 is a similar view showing one position of the parts of the index mechanism when the index is again locked up.
Figure 5 is a fragmentary side elevation of the index mechanism.

Keyed to the work spindle 42 is a ratchet wheel 195. 196 designates a plate that is secured by screws 194 (Fig. 2) to the guard 175. Pivotally mounted on this plate for movement about the axis of the stud 197 is a pawl 198 which is adapted to co-operate with the teeth of the ratchet wheel 195. (Figs. 3 and 4.)

The pawl 198 carries a roller 199. The levers 179 and 180 are formed at the ends most remote from their pivot 178 with long tail-like portions 201 and 202, the under-surfaces of which are formed as cams adapted to co-operate with the elongated roller 199 carried by the pawl 198. The construction is such that when either of the locking dogs 182 or 185 is in engagement with one of the index plates, the cam surface of the corresponding tail-portion 201 or 202 will be in engagement with the roller 199 of the pawl 198 and hold that pawl retracted from engagement with the teeth of the ratchet wheel 195. It is only when the two locking dogs are out of engagement with the two index plates that the pawl 198 can engage the ratchet wheel 195 under actuation of the spring-pressed plunger 204 which is housed in a lug 205 formed integral with the plate 196.

Pivotally mounted on the lever arm 180 is a cam-member 206. This cam-member 206 is continuously urged in one direction about its pivot 207 by a spring-pressed plunger 208 which is housed within a lug 209 formed integral with the lever arm 180. Pivotally mounted on the lever arm 179 is a similar cam member 211 which is continuously urged in one direction about its pivot 212 by spring-pressed plunger 213 which is housed in a lug 214 formed integral with the lever arm 179.

Secured by the screws 216 to an arm 217 which is formed integral with the guard 175 is a block 218. This block is formed with a cam surface 219.

A similar block 220 formed with a cam surface 221 is adjustably secured to the plate 196 by means of bolts 222 which pass through the arcuate slot 223 formed in the plate 196.

During actual cutting, one or other of the locking dogs 182 or 185 is engaged with one or other of the plates 165 or 166. It will be understood that as the cradle 22 oscillates, an oscillatory movement is imparted to the sleeve 43 through the segments 49, and 48, and that the motion of the sleeve is in turn imparted to the work spindle 42 as long as one or other of the locking dogs 182 or 185 is engaged with a notch of the corresponding plate 165 or 166.

Assuming that the sleeve is rotating in a clockwise direction looking from the end shown in Figure 3 and that the dog 185 is in engagement with a notch 168 of the index plate 166 and the dog 182 is riding on the periphery of the plate 165, it will be seen that the cam member 206 secured to the lever 180 will be brought into engagement with the block 218 and ride up on the cam surface 219 thereof, rocking the lever 180 about its pivot 178, withdrawing the locking dog 185 out of engagement with the notch of the index plate 166. This position is shown in Figure 3. This movement of the lever 180 disengages the cam surface of its tail-portion 202 from the roller 199 of the pawl 198. The dog 182 is already riding on the periphery of its plate 165 and therefore the cam surface of its tail-portion 201 is already disengaged from the roller 199. Hence, when the lever 180 is rocked to the position shown in Figure 3, the pawl 198 snaps into engagement with the ratchet wheel 195 under actuation of the spring-pressed plunger 204. This locks the work spindle 42 to the frame of the machine through the ratchet wheel 195, the pawl 198, the plate 196, the screws 197 and the guard 175. Thus, the work spindle 42 is held stationary while the sleeve moves on and with it the locking dogs 179 and 180 continue to rotate in the clockwise direction.

During this movement, the cam member 206 rides off of the block 218 but the locking dog 185 will remain out of engagement with the index plate 166 because it is riding on the periphery of that plate. As the motion in the clockwise direction continues, the dog 182 will drop into engagement with a notch 167 of the index plate 165, causing the pawl 198 to be withdrawn from engagement with the ratchet wheel 195 by reason of the engagement of the cam surface of the tail-portion 201 of the lever 179 with the roller 199. The work spindle is now relocked to the sleeve 43.

The cam 67 (Figs. 1 and 9) now causes the cradle to rotate in the reverse direction. During this return movement, the cam member 206 engages the block 218 but rocks out of the way without lifting the lever 180. During this return movement, also, the cam 211 engages the block 220 but rocks out of the way without lifting the lever 179.

Then the cradle reverses, again resuming its clockwise movement. The cutter has completed one tooth space of the blank and is withdrawn from engagement with the blank. The cam member 211, now traveling in a clockwise direction, comes into engagement with the block 220 and rides up on the cam surface 221 of this block, rocking the lever 179 about the pivot 178 and disengaging the dog 182 from the index plate 165. This carries the cam surface of the tail-portion 201 of the lever 179 away from the roller 199 of the pawl 198. The cam surface of the tail-portion 202 of the lever 180 is already disengaged from the roller 199 because the locking dog 185 is riding on the surface of the index plate 166. Thus, the pawl 198 is allowed to snap into engagement with the ratchet wheel 195 under actuation of the spring-pressed plunger 204; the work spindle is relocked to the frame and a relative rotational movement takes place between the sleeve 43 and the work spindle until the locking dog 185 comes into engagement with a notch 168 of the index plate 166, disengaging the pawl 198 from the ratchet wheel 195 and relocking the work spindle and the sleeve 43 together. The cycle then begins anew.

Figures 12, 13, 14, 15, 16, 17, 18:
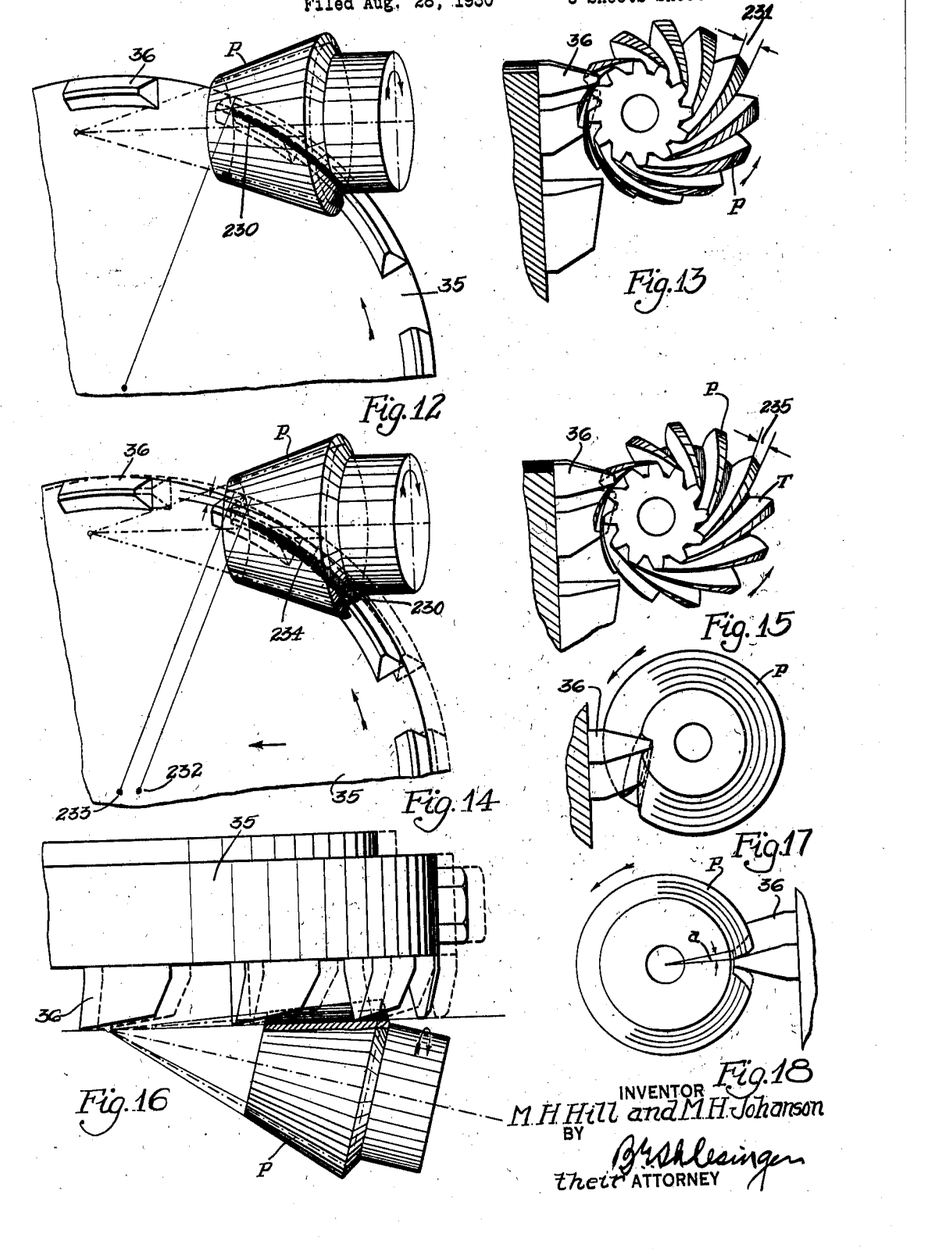

The principle of operation of the present machine and the principles upon which the process of the present invention are based are illustrated in Figures 12 to 18 inclusive. The cutter 35 is adjusted initially by adjustment of the slide 24 on the cradle and of the plate 28 on the slide 24 to position the cutter in the correct relation to the blank for cutting tooth spaces of the desired spiral angle on the blank and the blank P is adjusted to the correct angle and cone distance. Then the machine is put into operation. The cutter rotates in engagement with the blank at the same time feeding into depth; when full depth position is reached, the cradle roll begins, the cradle rotating in one direction and the blank simultaneously rotating in the opposite direction. At the end of the cradle roll in one direction, the tool will have cut a tooth slot in the blank, as clearly indicated by the shaded portion 230 in Figure 12, which at the bottom is of uniform width throughout its length. This leaves a large amount of stock on the teeth of the pinion blank which must be removed before the pinion is ready to run with its mate gear. In Figure 13 is shown what a pinion would look like if the roughing operation were stopped here as was the previous practice. The large ends of the teeth, as indicated at 231, are too thick. With the present invention, however, at the end of the cradle roll in one direction, the cutter is shifted and, also, the blank, so that during the cradle roll in the opposite direction, the cutter cuts in the same tooth space but from a different center.

The result of shifting the cutter is shown in Figures 14, 15 and 16. The dotted lines indicate the initial position of the cutter, the position corresponding to that of Figure 12, while the full lines indicate the second position of the cutter. In this second position, the center of the cutter will have moved from 232 to 233. It will be readily apparent that the slight rotational movement imparted to the blank, during this shifting of the cutter, is just sufficient to compensate for the shifting of the cutter in such way as to maintain the width of the slot at the small end of the pinion tooth unchanged. The path cut by the tips of the blades 36 when the cutter is in the position with its center at 233 is indicated by the shaded portion of uniform width, designated at 234 in Figure 14. This cut overlaps the cut 230 previously taken by the cutter when its center is at 232, the amount of overlapping increasing toward the small end of the tooth so that at the small end, the two cuts are identical and the width of the tooth slot at the small end remains unchanged. Through the two cuts taken from the two different centers 232 and 233, a tooth slot is produced which is of tapering width at its bottom measured from the small end to the large end thereof. As will be clear, by comparing the blank roughed according to this invention shown in Figure 15 with the roughed blank shown in Figure 13, the teeth P of the pinion will have been roughed to approximate size, as indicated at 235, leaving just sufficient stock on for the final finishing operation.

Figure 17 shows that in the shifting of the cutter, the width of groove at the small end of the pinion tooth remains unchanged while Figure 18 shows that when the cutter is shifted and the blank rotated through a corresponding small angle $a$, the width of groove at the large end of the tooth will be enlarged.

The operation of the machine itself will be understood from the preceding description but may be briefly summed up here. Assuming the cutter and blank to have been positioned in the correct relation as above described and the machine to be in operation the cutter will be rotated continuously from the pulley 40 through the pinion 38 and internal gear 37 (Figs. 1, 2 and 8). It will be first fed into depth, the feed movement being controlled by the cam 80 (Figs. 6 and 7), this cam being driven from the shaft 66 (Fig. 9) through the gearing 88, 89, the shaft 90, the gearing 91, 92, and the gearing 93, 94, 95 (Figs. 1, 9 and 7).

When the cutter has reached full depth position, the cradle roll begins, the cradle being actuated by the connecting rod 76 and cam 67 (Figs. 1 and 9), said cam being driven from the pulley shaft 39 through the gearing 52, 53, shaft 54, gears 55 and 56, shaft 57, gears 58 and 59, shaft 60, gears 61 and 62, worm 64, worm-wheel 65 and shaft 66 (Figs. 1, 8 and 9).

As the cradle rotates in one direction or the other, it imparts a corresponding rotary movement to the sleeve 43, in which the spindle 42 is mounted, through the crown gear segment 49 and the gear segment 48. In the upward movement of the cradle, the dog 185 is in engagement with a notch 168 of the index plate 166 (Figs. 3 and 4) so that the sleeve 43 and the work spindle 42 rotate together, thus imparting the correct rolling motion to the pinion blank being cut.

Near the end of the upward roll, the cam 206 (Figs. 3 and 4) on the lever 180 will engage the block 218 and ride up on the cam surface 219 of that block, rocking the lever 180 about its pivot 178 and disengaging the locking dog 185 from the index plate 166. This will cause the work spindle to be disconnected from the sleeve 43 (Fig. 2). Immediately, the pawl 198, which is mounted on the stationary plate 196, will engage the ratchet wheel 195 carried by the work spindle to lock the work spindle stationary while the sleeve rotates on. Thus a relative angular motion takes place between the sleeve 43 and the work spindle 42. The sleeve and work spindle are again connected together when the dog 182 comes into engagement with a notch of the index plate 165 in the further rotation of the sleeve 43. The engagement of the dog 182 with a notch of the index plate 165 will, of course, cause the pawl 198 to be disengaged from the ratchet wheel by reason of the operation of the cam surface of the tail-portion 201 of the lever 179.

During the time that the slight relative rotational movement is taking place between the sleeve 43 and the work spindle 42, the cutter is shifted. This takes place through operation of the cams 132 and 133. The cam 133 operates first to shift the valve 131 putting the line 144 on supply and the line 143 on exhaust, moving the piston 102 to the left from the position shown in Figure 1 and actuating the links and arms 104, 105, 106, 107, 109, 110, 113, and 114 to unclamp the slide 24 from the cradle. Immediately thereafter the cam 132 operates to move the valve 130 from the position shown in Figure 10, putting the line 142 on supply and the line 141 on exhaust. This moves the piston 120 to the left from the position shown in Figure 1, moving the slide 24 to the left. The amount of movement of the slide 24 is determined by the position of the nuts 122 and 123 which are threaded onto the piston rod 121.

The movement of the slide 24, as just described, shifts the center of the cutter the desired amount to carry the center from the position 232 in Figure 14 to the position 233. This amount is determined by the size of the pinion and the amount of taper which it is desired to have in the tooth spaces thereof. This movement combines with the slight relative rotational movement imparted to the pinion blank to cause the cause to cut correctly from a different center on the return roll of the machine.

As soon as the slide 23 has been shifted as described, the cam 133 operates to return the valve 131 to the position shown in Figure 10, putting the line 143 again on supply and the line 144 again on exhaust, thus causing the slide 24 with the cutter mounted thereon to be clamped to the cradle in its new position.

The cam 67 which controls the oscillation of the cradle now reverses the direction of movement of the cradle and in the return roll the cutter, as described, cuts from the new center but in the same tooth space of the pinion blank. In the return roll, the work spindle is, of course, locked to the sleeve 43 for rotation therewith by the dog 182 and the index plate 165.

When the cam-member 206 strikes the block 218, it pivots about the stud 207, compressing the spring-pressed plunger 208 and riding up over the block without moving the lever arm 180 or the dog 185.

When the cam-member 211 strikes the block 220, it pivots about the stud 212, compressing the spring-pressed plunger 213 and riding up over the block 220 without moving the lever arm 179 or the dog 182. Reversal of the direction of rotation of the cradle takes place directly after the cam-member has cleared the block 220, the cradle now moving upwardly again.

The cam member 211 now rides up on the cam surface 221 of the block 220, disengaging the locking dog 182 from the index plate 165 and permitting the pawl 198 to engage the ratchet wheel 195 under actuation of the spring-pressed plunger 204. The work spindle is thus again locked stationary while the sleeve 43 rotates on. The relative movement between the sleeve 43 and the work spindle 42 continues until the dog 185, which has been riding on the periphery of the plate 166, drops into engagement with the next notch of this plate 166, thus disengaging the pawl 198 from the ratchet wheel 195 and again connecting the work spindle to the sleeve 43 to rotate therewith. The amount of relative movement between the sleeve 43 and the work spindle is equal to the angular distance between the adjacent side surfaces of two adjacent tooth spaces to be cut in the pinion blank and thus the pinion blank is indexed to bring the next tooth slot into position to be cut.

Just before the indexing takes place, the cutter is withdrawn by operation of the cam (Fig. 7) to clear the blank so that the cutter does not interfere with the blank in the indexing operation.

During the indexing, the cam 133 operates to shift the valve 131 from the position shown in Figure 10, move the piston 102 again to the left from the position shown in Figure 1 and release the slide 24 from the cradle. Immediately thereafter, the cam 132 operates to shift the valve 132 back to the position shown in Figure 10, move the piston 120, shifting the cutter slide 24 and the cutter mounted thereon back to original position.

As soon as the shift of the cutter has taken place, the cam 133 again operates to move the piston 102 to the right and cause the tool slide 24 to be reclamped to the cradle in its original position.

The cam 80 (Fig. 7) now operates to impart a feeding motion to the cutter and the cycle begins anew.

In the manner described, all of the tooth spaces of the blank are cut.

In order to use the present machine for finishing pinions, all that is necessary is to shape the cam 67 so that sufficient roll is provided to roll out not only the tooth curve but the tooth profile. In a roughing operation, it is usual to provide only sufficient roll to roll out the tooth curve.

As above stated, the present invention is not limited to the cutting of pinions, as it may be employed equally as well in the roughing or finishing of gears and with or without a rolling motion.

In general, it may be said that while the invention has been described in connection with a particular embodiment and a particular use for that embodiment, it will be understood that the invention is capable of various further modifications and that the features of the invention are capable of various further uses. This application is intended to cover any adaptations, uses, or embodiments of the present invention following, in general, the principles of the invention and including such departures from the present disclosure as come within known or customary practice in the gear art and as may be applied to the essential features hereinbefore set forth and as fall within the scope of the invention or the limits of the appended claims.

Having thus described our invention, what we claim is:

1. In a machine for producing gears, a frame, a tool support adjustably mounted thereon, tool mechanism mounted on the tool support, means for securing the tool support in any adjusted position, and means for automatically releasing said securing means after one side face of a blank has been cut and thereafter shifting the tool support to permit cutting of the adjacent side face of the blank means for indexing the blank after each pair of tooth faces have been cut and means for returning the tool support to initial position after each pair of tooth faces have been cut.

2. In a machine for producing gears, a bed, a tool support adjustable on the bed, means for securing the tool support in any adjusted position, a work support, means for producing a relative oscillatory movement between the tool and work supports, means operative at one end of said oscillatory movement for automatically releasing said securing means and shifting the tool support to change the position of the tool path relative to the blank and again to reconnect the tool support to the bed, said means being operative at the other end of the oscillatory movement to again release the tool support and return the tool to initial position and then again reconnect the tool support to the bed and means for indexing the work support once for each oscillatory cycle to bring a new portion of the blank into position to have a tooth space cut therein on the ensuing oscillatory cycle.

3. The method of producing gears which comprises feeding the tool and blank into depth and cutting one side face of the blank from one center while rolling the tool and blank relative to each other in one direction, then shifting both the tool and blank and cutting the adjacent side tooth face of the blank from a different center while rolling the tool and blank together in the opposite direction, then withdrawing the tool and blank from engagement, returning the tool to initial position and indexing the blank to the next tooth space and repeating the series of operations on each pair of faces of the blank until the blank has been completed.

4. In a machine for producing gears, the combination with a sleeve and means for imparting an oscillatory movement thereto, of a work spindle rotatable in the sleeve, a pair of notched plates carried by the spindle with the notches of one plate staggered with reference to the notches of the other plate, an arm mounted on the sleeve, a pair of locking dogs carried by said arm and adapted to engage, respectively, the two plates, one dog being in engagement with one plate during the movement of the sleeve in one direction and the other dog being in engagement with the other plate during the movement of the sleeve in the opposite direction, a ratchet wheel also carried by the work spindle, a pawl normally disengaged from the ratchet wheel and operative connections between the pawl and the two locking dogs whereby when both dogs are disengaged from their plates, the ratchet pawl engages its wheel and when one dog is reengaged with its plate, the ratchet pawl is moved out of engagement with its wheel, and means at the limits of oscillating movements of the sleeve for disengaging the dogs.

5. In a machine for producing gears, a bed, a plate adjustable on the bed, a face mill cutter carried by the plate, means for securing the plate in any adjusted position on the bed, and fluid pressure operable means operated automatically after one tooth face of the blank has been cut to release the plate and thereafter move said plate on the bed to shift the position of the cutter relative to the blank preparatory to cutting the adjacent side face of the blank from a different center.

6. In a machine for producing gears, a bed, a plate adjustable on the bed, a face mill cutter carried by the plate, means for securing the plate in any adjusted position on the bed, a work support, means for producing a relative rolling movement between the tool and work support, and fluid pressure operated means operable automatically at predetermined points in said oscillatory movement to release the plate and shift the same.

7. In a machine for producing gears, a tool support, a face mill cutter journaled in the tool support, a work support, a work spindle journaled in the work support, means for shifting the tool when one side face of a tooth space of the blank has been cut and means for simultaneously moving the blank to position the tool and blank to permit cutting the adjacent side face of the blank from a different center, the means for shifting the tool being operative to return the tool to initial position after a tooth space has been cut, and means for indexing the blank after each tooth space has been cut to position the blank, also, for cutting of the next adjacent tooth space of the blank.

8. In a machine for producing gears, a tool support, a face mill cutter journaled in the tool support, a work support, a work spindle journaled in the work support, means for oscillating the work spindle, means for shifting the tool and for rotating the blank relative to the oscillating means after one side face of the blank has been cut to position the tool and blank for cutting an adjacent side face of the blank from a different center, said means for shifting the tool being operative after the second named face has been cut to return the tool to initial position, and means for simultaneously rotating the blank to index the same to bring the next adjacent tooth face of the blank into position for cutting.

9. In a machine for producing gears, a work spindle, a pair of index plates secured to the work spindle with the notches of one plate staggered with reference to the notches of the other plate, separate locking dogs adapted to engage the separate plates, means for producing a relative oscillatory movement between the tool support and the work spindle, means for disengaging one dog from its plate at the end of the oscillatory movement in one direction to permit rotative movement of the work spindle to bring the next adjacent face of the work into operative relation with the tool mechanism and means operative at the end of the roll in the opposite direction to rotate said work spindle to bring the next adjacent face of the blank into operative relation with the tool.

10. In a machine for producing longitudinally curved tooth gears, tool mechanism, means for imparting a cutting motion to the tool mechanism, a work support, means for producing an oscillatory rolling motion between the tool mechanism and the work support, means for shifting the tool mechanism between the forward and return rolls and for simultaneously rotating the blank slightly so that the tool cuts in the same tooth space of the blank but from a different center on the return roll, said tool shifting means being operative to return the tool mechanism to initial position at the end of the return roll, and means for indexing the blank after each oscillatory cycle has been completed.

11. In a machine for producing gears, tool mechanism, means for imparting a cutting motion to the tool mechanism, a work support, a work spindle journaled in the work support, a sleeve rotatably mounted on the work spindle, means for producing an oscillatory rolling motion between the tool mechanism and the sleeve, means adapted to connect the work spindle and the sleeve together during cutting, means for shifting the tool mechanism alternately in opposite directions between the roll in opposite directions, and means operating at both ends of the oscillatory movement to disconnect the work spindle from the sleeve and connect it to the work support to permit relative movement between the sleeve and spindle, said last named means being so constructed that a slight rotational movement is produced at the end of the roll in one direction and so that the blank is completely indexed at the end of the roll in the opposite direction.

12. In a machine for producing gears, a bed, a plate adjustable on the bed, a face mill gear cutter journaled on the plate, means for securing the plate in any adjusted position on the bed, a work support, means for producing a relative oscillatory rolling movement between the cutter and the work support, means operative between the forward and return rolls to release the plate, shift the same on the bed and resecure the plate to the bed and operative at the end of the return roll to again release the plate, shift it back to initial adjusted position and again secure it to the bed, whereby opposite sides of the tooth spaces of the blank are cut from different centers during the roll in opposite directions, and means for indexing the work support once for each oscillatory cycle.

13. In a machine for producing gears, a bed, a plate adjustable on the bed, a face mill gear cutter journaled on the plate, means for securing the plate in any adjusted position on the bed, a work support, means for producing a relative oscillatory rolling movement between the cutter and the work support, means operative between the forward and return rolls to release the plate, shift the same on the bed and re-secure the plate to the bed and operative at the end of the return roll to again release the plate, shift it back to initial adjusted position and again secure it to the bed, means for slightly rotating the blank on its axis at the end of the forward roll whereby opposite sides of the tooth spaces of the blank are cut from different centers during the roll in opposite directions and means for indexing the blank at the end of the return roll.

14. The method of cutting a longitudinally curved tooth gear which comprises cutting one side tooth surface of the blank by moving the cutter in a longitudinally curved path across the face of a tapered gear blank while rolling the tool and blank relative to one another in one direction, then shifting the tool path and simultaneously rotating the blank through a slight angle on its axis so that the tool will cut from a different center, and then cutting the adjacent side tooth surface of the blank by moving the tool across the face of the blank and rolling the tool and blank relative to one another in the opposite direction.

15. In a machine for producing gears, a work support, a tool support, a rotary face-mill gear cutter journaled in the tool support, means for producing a relative oscillatory movement between the tool and work supports to generate the tooth profiles, and means for shifting the tool support automatically in one direction at one end of the oscillating movement and for automatically returning the tool support to original position at the opposite end of the oscillating movement and means for withdrawing the cutter from engagement with the blank and for indexing the blank after each complete oscillating cycle.

MAXWELL H. HILL.
MAGNUS H. JOHANSON.